(12) United States Patent
Keitsch et al.

(10) Patent No.: US 12,548,783 B2
(45) Date of Patent: Feb. 10, 2026

(54) BIPOLAR PLATE AND FUEL CELL STACK

(71) Applicant: AUDI AG, Ingolstadt (DE)

(72) Inventors: Oliver Keitsch, Heilbronn (DE); Raimund Theo Ströbel, Heilbronn (DE)

(73) Assignee: AUDI AG, Ingolstadt (DE)

( * ) Notice: Subject to any disclaimer, the term of this patent is extended or adjusted under 35 U.S.C. 154(b) by 341 days.

(21) Appl. No.: 17/928,859

(22) PCT Filed: Oct. 22, 2021

(86) PCT No.: PCT/EP2021/079335
§ 371 (c)(1),
(2) Date: Nov. 30, 2022

(87) PCT Pub. No.: WO2022/090078
PCT Pub. Date: May 5, 2022

(65) Prior Publication Data
US 2023/0253576 A1    Aug. 10, 2023

(30) Foreign Application Priority Data
Oct. 26, 2020 (DE) .................. 10 2020 128 107.2

(51) Int. Cl.
*H01M 8/0258* (2016.01)
*H01M 8/0267* (2016.01)
*H01M 8/2465* (2016.01)

(52) U.S. Cl.
CPC ....... *H01M 8/0258* (2013.01); *H01M 8/0267* (2013.01); *H01M 8/2465* (2013.01)

(58) Field of Classification Search
CPC ............. H01M 8/0258; H01M 8/0267; H01M 8/2465; H01M 8/0254; H01M 8/0265; Y02E 60/50
See application file for complete search history.

(56) References Cited

U.S. PATENT DOCUMENTS 7,687,182 B2 * 3/2010 Goebel ............... H01M 8/2483
429/434
7,829,231 B2 * 11/2010 Formanski .......... H01M 8/2457
429/514
10,062,912 B2 * 8/2018 Poirot-Crouvezier .......................
H01M 8/0254
10,122,025 B2 * 11/2018 Ricketts ............. H01M 8/0254
2014/0329168 A1 * 11/2014 Dang .................. H01M 8/0228
429/492
2014/0342264 A1 * 11/2014 Fellows ............. H01M 8/2483
429/535
2017/0110739 A1 * 4/2017 Andreas-Schott .... H01M 8/026
2017/0214063 A1 7/2017 Poirot-Crouvezier
2018/0366752 A1 * 12/2018 Zillich ................ H01M 8/1004
2022/0352529 A1 * 11/2022 Lucas ................ H01M 8/0206

FOREIGN PATENT DOCUMENTS

| CN | 101308936 A | 11/2008 |
|---|---|---|
| CN | 110380073 A | 10/2019 |
| DE | 102008056900 A1 | 5/2010 |
| DE | 102014206333 A1 | 10/2015 |
| DE | 102014206335 A1 | 10/2015 |
| DE | 102015200573 A1 | 7/2016 |
| DE | 102015214517 A1 | 2/2017 |
| DE | 102015225228 A1 | 5/2017 |
| DE | 102017124843 A1 | 5/2018 |
| WO | 2010054744 A1 | 5/2010 |

OTHER PUBLICATIONS

International Search Report, mailed Feb. 8, 2022, for International Patent Application No. PCT/EP2021/079335. (2 pages).

* cited by examiner

*Primary Examiner* — Muhammad S Siddiquee
(74) *Attorney, Agent, or Firm* — Seed Intellectual Property Law Group LLP

(57) ABSTRACT

A bipolar plate formed from two interconnected individual plates is provided, which individual plates are each formed with a reactant flow field on plate surfaces facing away from each other, which reactant flow field comprises a plurality of flow ducts for a reaction medium which are delimited by walls of webs, wherein the webs and the flow ducts of one of the individual plates extend in an active region opposite to the webs and the flow ducts of the other of the individual plates, so as to form coolant ducts of a coolant flow field extending between the individual plates. Outside of and/or in an edge area of the active region, there is a lateral offset between the webs of the individual plates, in such a way that coolant ducts of the coolant flow field running adjacent thereto are fluidically connected to one another by means of pass-through openings for distributing a coolant flow. The invention also relates to a fuel cell stack with a plurality of such bipolar plates.

8 Claims, 3 Drawing Sheets

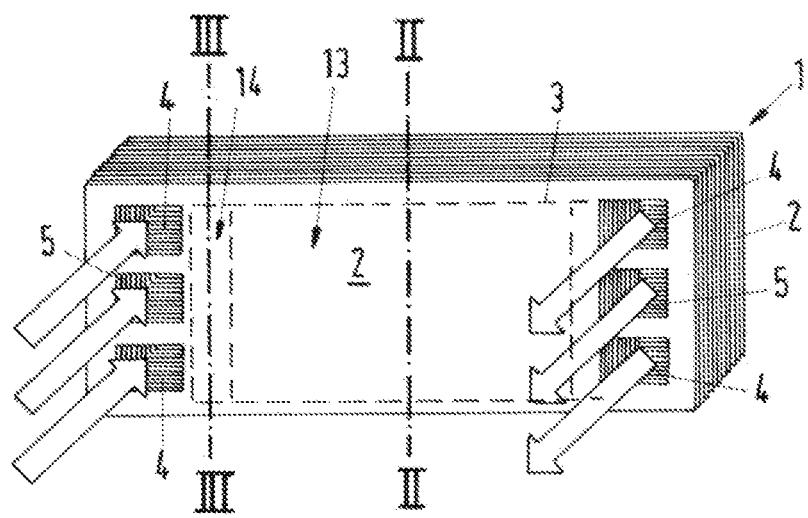
Fig.1
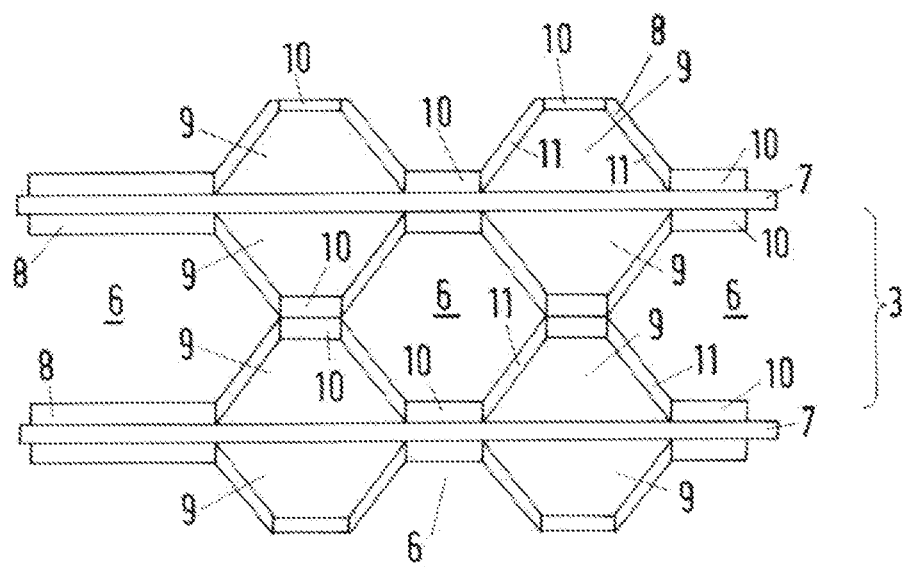
Fig.2 II-II

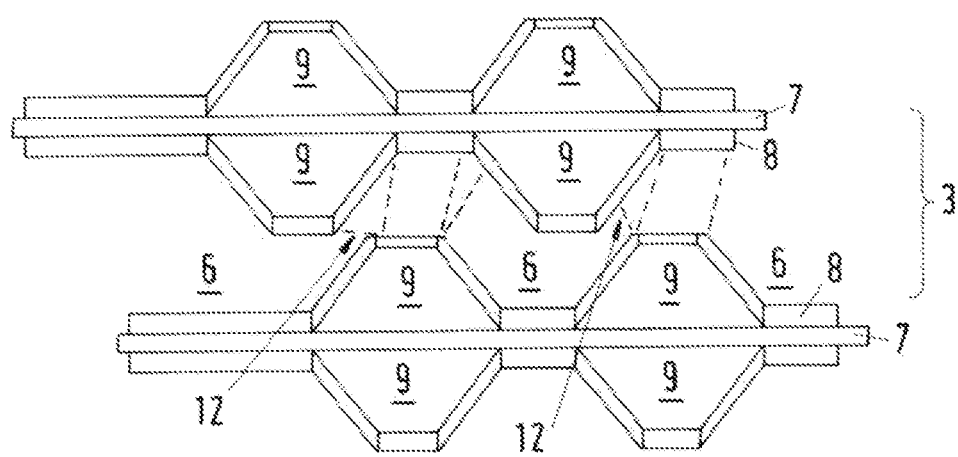
Fig.3  III-III
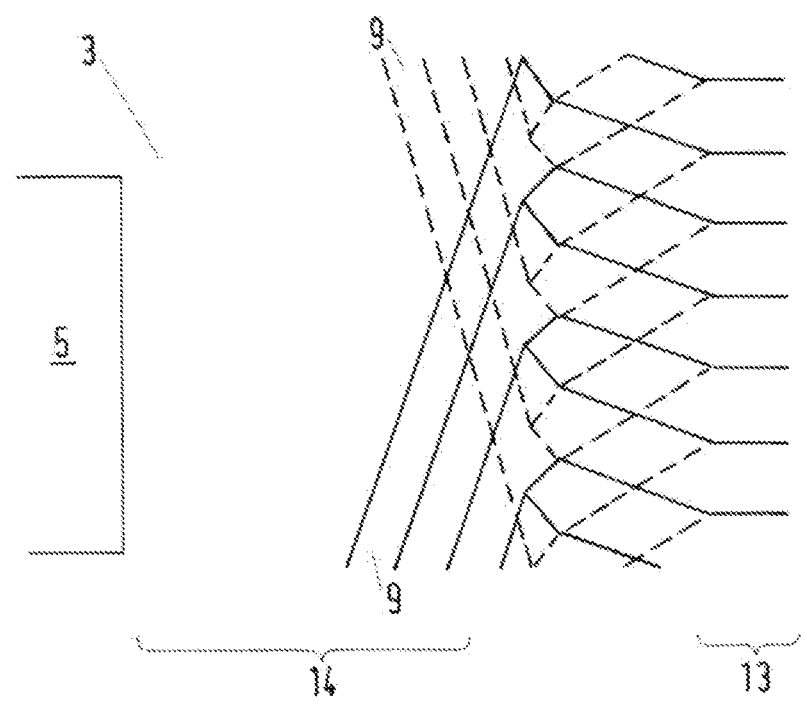
Fig.4

BIPOLAR PLATE AND FUEL CELL STACK

BACKGROUND

Technical Field

This disclosure relates to a bipolar plate formed from two interconnected individual plates. Each of the individual plates has a reactant flow field for one reactant of the fuel cell reaction, wherein in each case, one of the flow fields is present on each of the plate surfaces facing away from each other when connected. Each reactant flow field comprises a plurality of flow ducts for a reactant, which ducts are delimited by walls of webs. In an active region, the webs and the flow ducts of one of the individual plates lie opposite the webs and the flow ducts of the other of the individual plates, such that, in other words, they are aligned with each other in the active region. In this way, the facing plate surfaces of the individual plates form a coolant flow field extending between the individual plates. This disclosure also relates to a fuel cell stack with a plurality of fuel cells, to which such bipolar plates are associated.

Description of the Related Art

Fuel cell devices are used for the chemical conversion of a fuel with oxygen to water in order to generate electrical energy. For this purpose, fuel cells contain as a core component a so-called membrane electrode assembly (MEA), which is a composite of a proton-conducting membrane and an electrode (anode and cathode) arranged on both sides of the membrane. In addition, gas diffusion layers (GDL) can be arranged on both sides of the membrane electrode assembly on the sides of the electrodes facing away from the membrane. During operation of the fuel cell device with a plurality of fuel cells combined to form a fuel cell stack, the fuel, in particular hydrogen $H_2$ or a hydrogen-containing gas mixture, is supplied to the anode, where an electrochemical oxidation of $H_2$ to $H^+$ takes place with the release of electrons. The protons $H^+$ are transported from the anode chamber to the cathode chamber by means of the electrolyte or the membrane, which separates the reaction chambers from one another in a gas-tight manner and electrically insulates them. The electrons provided at the anode are supplied to the cathode by means of an electrical line. Oxygen or an oxygen-containing gas mixture is supplied to the cathode, such that a reduction of $O_2$ to $O^{2-}$ takes place with a gain in the electrons. At the same time, these oxygen anions react in the cathode chamber with the protons transported across the membrane to form water.

The reactant gases are supplied to the electrodes of the fuel cells by means of bipolar plates. In addition to the reactant gases, a cooling medium is also passed through the bipolar plates due to the heat generated during the reaction of the fuel cells, such that three different media are passed through the bipolar plates in the very smallest of space.

When supplying the fuel cells with reactants, these are supplied into the bipolar plates by means of main ducts (ports), which are intended to distribute the reactants in an active region in order to supply the entire area of the electrodes as uniformly as possible by means of a flow field. Since a plurality of bipolar plates are stacked with the membrane electrode units in the fuel cell stack, seals are used that longitudinally seal off the main ducts through the fuel cell stack. In addition, a good seal must be made against the coolant flowing in the coolant ducts.

Bipolar plates with distribution regions, which are intended to bring about a uniformity of the reactant flows in a distribution region, can be found in the publications US 2017/0 214 063 A1, DE 10 2015 225 228 A1 and DE 10 2014 206 333 A1.

In the development phase, less importance has been attached to the routing of the cooling medium over or in the bipolar plates than to the guidance of the reactant flows. As a result, conventional bipolar plates do not yet provide an optimum uniform distribution of the cooling medium, such that local overheating (a so-called "hotspot") can occur due to a low volume flow that is solely present locally.

BRIEF SUMMARY

Embodiments of the present invention provide a bipolar plate and a fuel cell stack that prevent such local overheating.

The bipolar plate according to embodiments of the invention is characterized, in particular, by the fact that outside of and/or in an edge area of the active region, there is a lateral offset between the webs of the individual plates in such a way that coolant ducts of the coolant flow field running adjacent thereto are fluidically connected to one another by way of pass-through openings for distributing a coolant flow.

In this way, there exists a uniformity or homogenization of the coolant just before the active region or at the very edge of the active region, such that local overheating or hotspots are effectively prevented. The region in which the coolant ducts cross due to the lateral offset of the webs can also, for example, be a distribution region which directly adjoins the media ports, wherein the crossing region with the flow openings for the coolant can also be present between the active region and a distribution region.

It has proven to be advantageous if the webs of one of the individual plates that are located outside of and/or in an edge area of the active region are angled at a first angle to the webs in the active region. The first angle is chosen depending on the specific design of the bipolar plate. The length of the existing crossings or pass-through openings there also depends in particular on the desired design of the bipolar plate.

In addition, it is possible that the webs of the other individual plates located outside of and/or in an edge area of the active region are angled at a second angle to the webs in the active region. This also makes it possible to create a pass-through opening that leads to a uniform distribution of the coolant flow over the bipolar plate.

The first angle is preferably different from the second angle and both angles are other than zero. Here, the first angle may be a positive angle and the second angle may be a negative angle, wherein the two angles may however be equal in magnitude. In this context, it is therefore possible that all webs are angled to the same degree, such that a desired equal distribution of the cooling medium can be brought about.

The length of the angled webs and the flow ducts between them is preferably between 5 and 50 mm. In this way, a uniform distribution of the coolant flow is brought about over a very tightly delimited area, such that the bipolar plate as such can be configured to be very compact. Only afterwards do the webs and the flow channels transition into the opposite configuration in the active region.

In order to accomplish only a slight adjustment of the webs and the flow ducts between them, it has proven advantageous if the angle of the webs of the first and/or the second individual plate falls between 10 degrees and 45 degrees. Such an angular position is already sufficient to prevent hotspots over the extension of the bipolar plate.

In order to bring about an even more uniform, in particular turbulent, flow of the coolant, it has proven advantageous if the angle of the webs of the first and/or the second individual plate falls between 45 degrees and 80 degrees.

A compact design of a bipolar plate can be realized by connecting the flow ducts delimited by the angled webs to a main duct located in one corner of the individual plates. The angled webs are preferably positioned as close as possible to the active region, since the same number of cathode and anode ducts is preferably present in the active region due to the opposite configuration.

In addition, it has proven advantageous if the coolant ducts are fluidically connected to a main coolant duct arranged at the plate edge between two main ducts of the reactants.

The advantages, advantageous embodiments and effects explained in connection with the bipolar plate according to embodiments of the invention apply to the same extent to a fuel cell stack according to embodiments of the invention, which is equipped with a plurality of fuel cells with such bipolar plates. This fuel cell stack is also characterized by improved thermal management due to the prevention of local hotspots.

The features and combinations of features mentioned above in the description, as well as the features and combinations of features mentioned below in the description of the figures and/or shown alone in the figures, can be used not only in the respectively indicated combination, but also in other combinations or on their own. Thus, other embodiments are also to be regarded as encompassed and disclosed herein which are not explicitly shown or explained in the figures, but which arise from the elucidated embodiments and which can be generated by means of separate combinations of features.

BRIEF DESCRIPTION OF THE SEVERAL VIEWS OF THE DRAWINGS

FIG. 1 shows a schematic representation of a fuel cell stack comprising a plurality of fuel cells with the bipolar plates showing the main ducts.

FIG. 2 shows a schematic detailed view of section II-II of the bipolar plate of FIG. 1.

FIG. 3 shows a schematic detailed view of section of the bipolar plate of FIG. 1.

FIG. 4 shows a schematic detailed plan view of the webs and flow ducts of the reactant flow fields, with the ducts of the first reactant shown with solid lines and the ducts of the second reactant shown with dashed lines.

DETAILED DESCRIPTION

Figure 5:
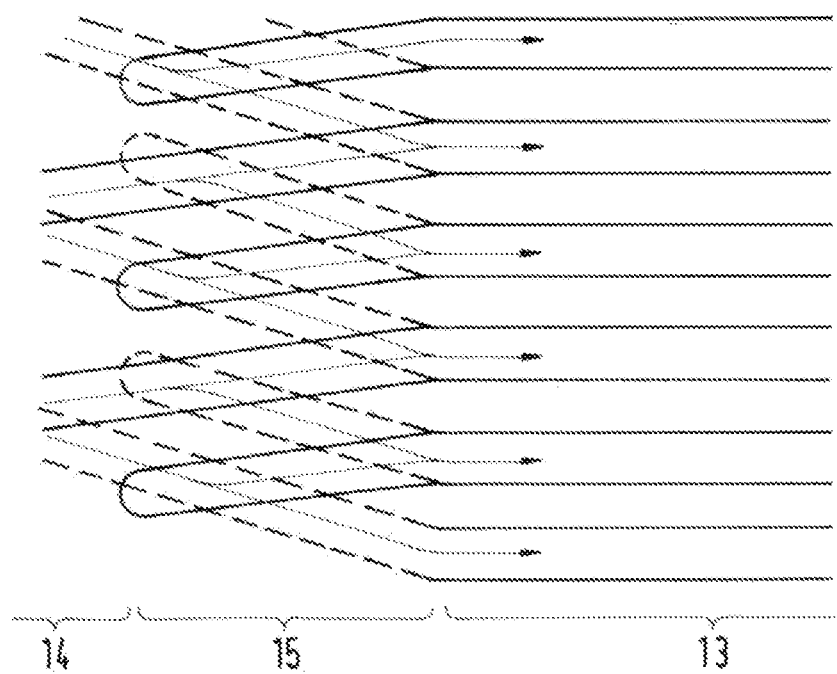
FIG. 5 shows a representation corresponding to FIG. 4 showing the coolant crossing/coolant distribution resulting from the adjustment of the webs/flow ducts.

A fuel cell stack 1, shown in FIG. 1, comprises a plurality of fuel cells 2 connected in series. Each of the fuel cells 2 comprises an anode and a cathode, as well as a proton-conducting membrane separating the anode from the cathode. The two electrodes together with the membrane form a membrane electrode assembly (MEA for short) 7. The membrane is formed from an ionomer, such as a sulfonated polytetrafluoroethylene (PTFE) or a perfluorinated sulfonic acid (PFSA) polymer. Alternatively, the membrane may be formed as a sulfonated hydrocarbon membrane.

Fuel (for example, hydrogen) is supplied to the anodes via anode chambers within the fuel cell stack 1. In a polymer electrolyte membrane fuel cell (PEM fuel cell), fuel or fuel molecules are split into protons and electrons at the anode. The membrane allows the protons (for example $H^+$) to pass through, but it is impermeable to the electrons ($e^-$). In so doing, the following reaction takes place at the anode: $2H_2 \rightarrow 4H^+ + 4e^-$ (oxidation/electron release). Whereas the protons pass through the membrane to the cathode, the electrons are conducted to the cathode or to an energy storage device via an external circuit. Cathode gas (for example, oxygen or oxygen-containing air) can be supplied to the cathodes via cathode chambers within fuel cell stack 1, such that the following reaction occurs on the cathode side: $O_2 + 4H^+ + 4e^- \rightarrow 2H_2O$ (reduction/electron capture).

Compressed air is supplied by means of a compressor to the fuel cell stack 1 via a cathode fresh gas line. In addition, the fuel cell stack 1 is connected to a cathode exhaust gas line. On the anode side, hydrogen held in a hydrogen tank is supplied to the fuel cell stack 1 via an anode fresh gas line to provide the reactants required for the electrochemical reaction in a fuel cell 2. These gases are transferred to bipolar plates 3, which have main ducts 4 (ports) for distributing the gases to the membrane and for eliminating them. In addition, the bipolar plates have main coolant ducts 5 (ports) for the pass-through of a cooling medium in a coolant duct 6, such that three different media are conveyed in the least amount of space.

FIG. 1 also shows the main ducts 4, 5, each grouped into pairs, of a plurality of fuel cells 2 with bipolar plates 3 forming the fuel cell stack 1.

A detailed section of the fuel cell stack 1 of FIG. 1, along section II-II, is shown in FIG. 2. This section runs through the active region 13 of the fuel cell stack 1. The active region 13 of the bipolar plate 3 is of course not electrochemically active itself, but it is arranged adjacent to those constituents of the fuel cell 2 where the electrochemical fuel cell reaction takes place. It can be seen that the bipolar plate 3 in this active region 13 has the reactant flow fields on its surfaces facing away from each other, which are arranged opposite each other and thus form a face-to-face configuration. The reactant flow fields each have a plurality of flow ducts 9 for the respective reaction medium, delimited by the walls 11 of the webs 10. In this active region 13, the webs 10 and the flow ducts 9 of one of the individual plates 8 are thus arranged opposite the webs 10 and the flow ducts 9 of the other individual plates 8. In this way, coolant ducts 6 of a coolant flow field extending between the individual plates 8 are formed.

If the coolant in the coolant ducts 6 is not present at the same pressure or with the same volume flow, spots of local overheating (so-called "hotspots") can occur. It is therefore advantageous to distribute the coolant flow more uniformly in order to prevent such spots of local overheating.

This is where the bipolar plate 3 according to embodiments of the invention comes in, which can be seen in more detail, along section III-III from FIG. 1, in FIG. 3. The bipolar plate 3 provides a lateral offset between the webs 10 of the individual plates 8 outside of and/or in an edge area of the active region 13. This offset is selected in such a way that adjacent coolant ducts 6 of the coolant flow field are fluidically connected to each other by way of pass-through openings 12 for distributing a coolant flow. In this way, the coolant can thus once again be uniformly distributed shortly before or directly at the edge of the active region 13 by way of a suitable split, such that a homogeneous coolant flow is present across the coolant flow field in the active region 13.

In FIG. 3, only the offset of one of the two individual plates 8 can be seen, although the other of the two individual plates 8 can also be offset.

As shown in FIG. 4, the webs 10 of one of the individual plates 8 are oriented outside of and/or in an edge area of the active region 13 skewed at an angle relative to the webs 10 in the active region 13 by a first angle. Furthermore, it can be seen that the webs 10 of the other individual plates 8 outside of and/or in an edge area of the active region 13 are also angled at a second angle with respect to the webs 10 in the active region 13. In FIG. 4, the same angle is selected by way of example for the positioning of the webs 10, whereby this angle was selected positively for one of the individual plates 8 and negatively for the other of the individual plates 8. In this way, the pass-through openings 12 shown in FIG. 3 are created in the coolant flow field located between the two individual plates 8, which leads to an equalization of the coolant across the bipolar plate 3.

Depending on the bipolar plate design, it is considered advantageous if the angled webs 10, as well as the flow ducts 9 running between them are between 5 mm and 50 mm long before they transition to an opposite configuration in the active region 13. In some embodiments, all webs 10 are angled to the same degree. Depending on the design, the angle falls between 10 degrees and 45 degrees, whereas in another alternative design of the bipolar plate 3, the angle falls between 45 degrees and 80 degrees.

Of course, the flow ducts 9 delimited by the angled webs 10 are each fluidically connected to one of the main ducts 4, which in the present case is arranged in one corner of the two rectangular individual plates 8. The coolant ducts 6, which are interlaced in their crossing region 15 due to the flow openings 12, are in turn fluidically connected to the main coolant duct 5, which is located at the plate edge between two of the main ducts 4.

Lastly, FIG. 5 once again shows how the coolant is distributed due to the pass-through openings 12, resulting in a more uniform distribution of coolant over the bipolar plate 3. Here, the plurality of pass-through openings 12 can be present in the edge area 15 of the active region 13, wherein the crossing region 15 can also be outside of the active region 13. In some embodiments, a suitable distribution region 14 is still present between the crossing region 15 and the media ports 4, 5 in order to also distribute the reactants uniformly over the reactant flow fields.

As a result, embodiments of the present invention thus enable a uniform distribution of heat since the coolant can be uniformly distributed over the bipolar plate 3 and thus uniformly distributed over the entire fuel cell stack 1.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate, comprising:
   two interconnected individual plates, which are each formed with a reactant flow field on plate surfaces facing away from each other, which reactant flow field comprises a plurality of reaction medium flow ducts for a reaction medium which are delimited by walls of webs, wherein the webs and the reaction medium flow ducts of a first plate of the individual plates extend in an active region opposite to the webs and the reaction medium flow ducts of a second plate of the individual plates, so as to form coolant ducts of a coolant flow field extending between the first and second plates at least within the active region,
   wherein a crossing region of the coolant ducts is provided outside of and/or in an edge area of the active region,
   wherein the webs of the first plate in the crossing region are angled at a first angle with respect to the webs in the active region and define first coolant duct passages in the first plate,
   wherein the webs of the second plate in the crossing region are angled at a second angle with respect to the webs in the active region and define second coolant duct passages in the second plate,
   wherein, apart from outermost ones of the first and second coolant duct passages at opposing edges of the crossing region, each first coolant duct passage of the first plate extends at the first angle to intersect with at least two of the second coolant duct passages of the second plate that extend at the second angle, and each second coolant duct passage of the second plate extends at the second angle to intersect with at least two of the first coolant duct passages of the first plate that extend at the first angle, and
   wherein, as a result, there is a lateral offset provided between the webs of the first and second plates at locations within the crossing region in such a way that the coolant ducts of the coolant flow field running adjacent thereto are fluidically connected to one another by pass-through openings for distributing a coolant flow.

2. The bipolar plate according to claim 1, wherein the webs and the reaction medium flow ducts extend between 5 and 50 millimeters in length in the crossing region before transitioning to a different configuration in the active region.

3. The bipolar plate according to claim 1, wherein all webs are angled to the same degree.

4. The bipolar plate according to claim 3, wherein the angle falls between 10 degrees and 45 degrees.

5. The bipolar plate according to claim 3, wherein the angle falls between 45 degrees and 80 degrees.

6. The bipolar plate according to claim 1, wherein the reaction medium flow ducts delimited by the webs are each fluidically connected to a main duct arranged in a corner of the individual plates.

7. The bipolar plate according to claim 6, wherein the coolant ducts are fluidically connected to a main coolant duct arranged at a plate edge between two main ducts.

8. A fuel cell stack comprising a plurality of fuel cells with bipolar plates according to claim 1.

* * * * *